March 29, 1966     R. W. LOVELL ETAL     3,243,594
ELECTRO-OPTICAL POSITIONING SYSTEM Filed July 9, 1962     3 Sheets-Sheet 1

INVENTORS
MALCOLM F. MAC DONALD
BY    ROBERT W. LOVELL

ATTORNEY

March 29, 1966     R. W. LOVELL ETAL     3,243,594

ELECTRO-OPTICAL POSITIONING SYSTEM

Filed July 9, 1962     3 Sheets-Sheet 2

INVENTORS
MALCOLM F. MACDONALD
BY ROBERT W. LOVELL

ATTORNEY

March 29, 1966 R. W. LOVELL ETAL 3,243,594
ELECTRO-OPTICAL POSITIONING SYSTEM
Filed July 9, 1962 3 Sheets-Sheet 3

INVENTORS
MALCOLM F. MAC DONALD
BY ROBERT W. LOVELL

*James E. Olson*
ATTORNEY

United States Patent Office 3,243,594
Patented Mar. 29, 1966

3,243,594
ELECTRO-OPTICAL POSITIONING SYSTEM
Robert W. Lovell, Bedford, and Malcolm F. MacDonald, Chelmsford, Mass., assignors to Sylvania Electric Products Inc., a corporation of Delaware
Filed July 9, 1962, Ser. No. 208,247
8 Claims. (Cl. 250—220)

The present invention relates generally to electro-optical systems and is more particularly concerned with an electro-optical system for controlling the position of a surface.

Parabolic antennas of the type used for radar and radio astronomy have reached such large proportions that the weight of the structure causes the antenna surface to deform as the antenna is rotated about the vertical axis. Consequently, the surface must be corrected for each antenna orientation so that a true parabolic surface is maintained. One method that has been proposed for accomplishing this result utilizes a pair of chopped light beams, which intersect at a point which defines the correct position of a portion of the surface being controlled. Other pairs of similar light beams define other points of the surface, the entire surface thereby being defined by a plurality of points located in space. Two light sensors are provided for each pair of light beams and are located such that each receives light from only one of the associated pair of light sources. The sensors are mounted for movement parallel to the surface and also for rotation about an axis parallel to the surface. When light is received by both sensors, the surface is correctly positioned and no error signal is generated. When only one sensor receives light, an error signal is generated which actuates a servomotor to correct the portion of the surface controlled by that pair of sensors. Since the surface can move in any direction when the antenna is rotated, the sensors must be provided with positioning servo-mechanisms so that they can be aligned with their respective light beams. It will be appreciated, then, that the control system required to maintain the surface position is extremely complex, since the sensors, in addition to the surface, must be repositioned each time the surface moves. An additional difficulty involved in using two sensors is that the linearity of response of the sensors in each pair must be carefully matched in order to balance their outputs.

With an appreciation of the foregoing limitations of a known positioning system, applicants have as a primary object of their invention to provide an improved electro-optical positioning system.

Another object of the present invention is to provide an electro-optical positioning system having a light sensor which is in fixed relationship with the surface being positioned.

Still another object of the invention is to provide an electro-optical positioning system having a single light sensor.

A further object is to provide a single light sensor which is selectively responsive to light from two sources.

Briefly, the invention resides in the use of a single sensing element which, in response to light beams from two projectors which are being chopped at different frequencies, produce components of current proportional to the area of sensor illuminated by the two light sources. The sensing element is located on the surface being positioned and is so arranged relative to the light projectors that when the surface is correctly positioned, each projector illuminates equal areas of the sensing element. When the surface is not correctly positioned, the sensing element is unequally illuminated by light from the two projectors, the sensor generating unequal components of current to produce an error signal which activates control circuitry to correct the surface position.

The foregoing and other objects, features, and advantages of the invention, and a better understanding of its construction and operation, will become apparent from the following detailed description taken in conjunction with the accompanying drawings, in which.

Figure 1:
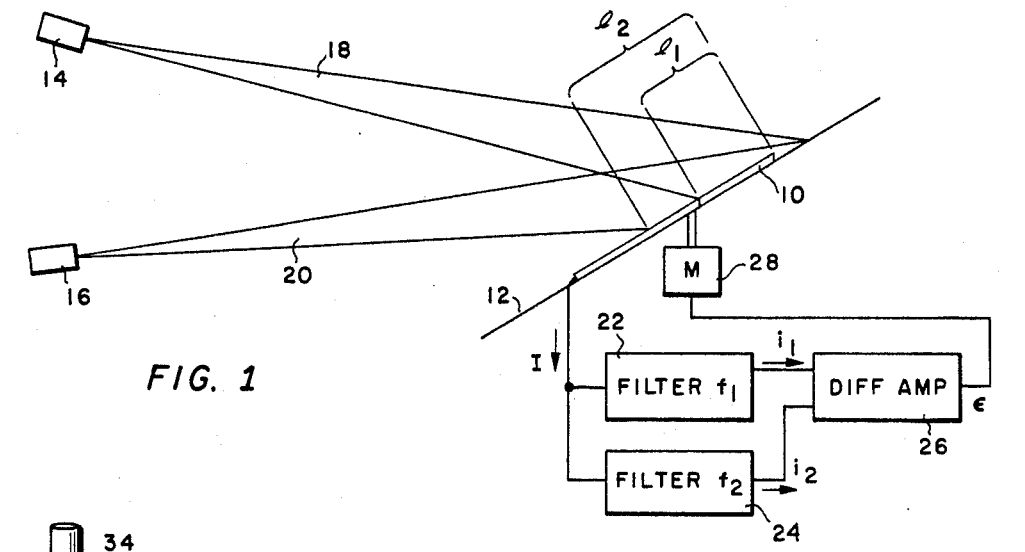
FIG. 1 is a schematic representation illustrating the operating principles of the present invention.

The operation of the invention is best described by referring to FIG. 1 which shows a photovoltaic sensor 10 attached to a surface 12, whose position is to be maintained, and arranged to receive light from a pair of projectors 14 and 16. Sensor 10 can be any of several well known types in which the current produced is proportional to the illuminated area of the sensor. Preferably, however, the sensor is of the silicon photovoltaic type since these have a fast frequency response of 5–20 microseconds and a spectral pass-band of 5,500–10,000 angstroms, which corresponds most nearly to the spectral passband of the incandescent lamps used in the light projectors. The projectors each produce a beam of light chopped at a different frequency. Thus, light beam 18 from projector 14 is chopped at frequency $f_1$, while light beam 20 from projector 16 is chopped at frequency $f_2$. These two frequencies must be harmonically unrelated and of sufficient separation to allow electronic filtering.

When projector 14 alone illuminates sensor 10, a current $i_1$ at frequency $f_1$ and of a magnitude proportional to the length $l_1$ is generated. Similarly, when projector 16 alone illuminates the sensor, a current $i_2$ at frequency $f_2$ and proportional to length $l_2$ is generated by the sensor. When both projectors simultaneously illuminate the sensor, a current I is produced which contains components $i_1$ and $i_2$ generated respectively by light beams 18 and 20. It should be noted that the light beams must illuminate the sensor out to the end thereof from which $l_1$ and $l_2$ are measured. The current components $i_1$ and $i_2$ can be recovered by filters 22 and 24 which are tuned respectively to frequencies $f_1$ and $f_2$. The output signals of the filters 22 and 24 are rectified and presented to a differential amplifier 26 which produces an error signal proportional to the difference in magnitude between the two input signals. The sense of the error signal is determined by the relative magnitude of the current components, which is directly related to the relative lengths of illumination. Consequently, when $l_1 > l_2$, the error signal may be made positive, and when $l_2 > l_1$, the error signal would then be negative The sensor is located with respect to the projectors so that equal lengths of sensor are illuminated by each projector when the surface 12 is correctly positioned. It follows that no error signal is produced when equal lengths of sensor are illuminated. However, when the surface is out of position and the sensor consequently unequally illuminated, an error signal is generated which can be used to drive a servomotor 28 connected to surface 12 and arranged to move the surface either up or down depending on the sense of the error signal. In the illustrated example, $l_2$ is greater than $l_1$, making $i_2$ greater than $i_1$; consequently, the sense of the error signal is negative causing servomotor 28 to move surface 12 downward until $l_1=l_2$.

Figure 2:
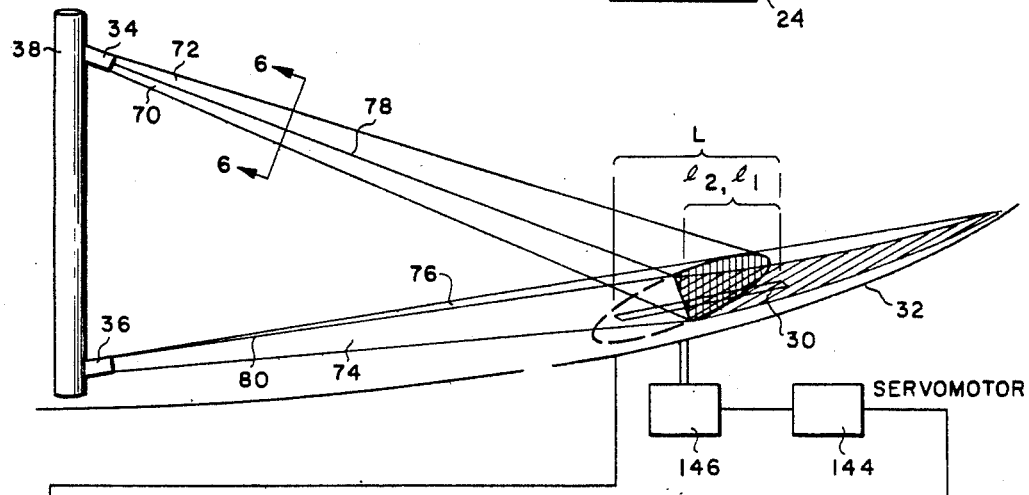
FIG. 2 is a partially schematic representation of a preferred embodiment of the present invention.
Figure 2:
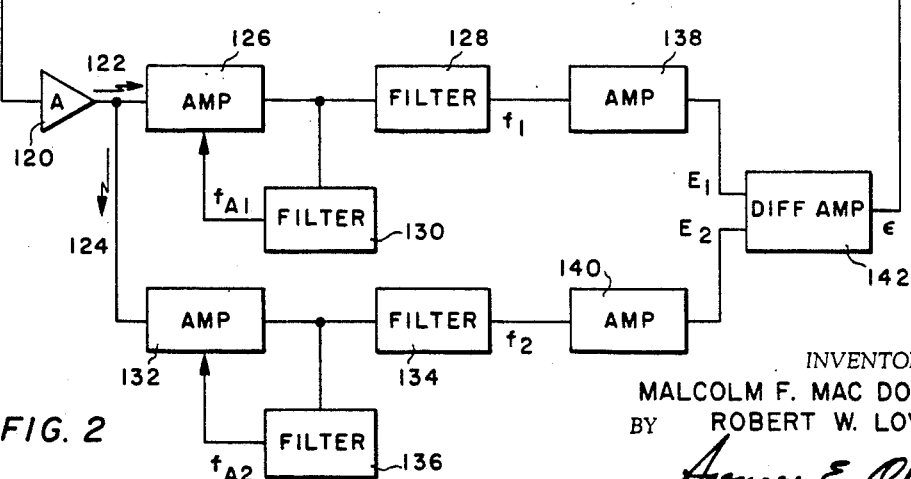

FIG. 2 illustrates, in block diagram form, the incorporation of the invention in a system for maintaining the surface of an antenna to a desired contour.

In this system, a photovoltaic sensor 30 is attached to the portion 32 of the surface of a large antenna reflector and is arranged to receive light from a pair of projectors 34 and 36, which are located on a tower 38 extending through the center of the antenna surface. In a typical installation, the reflector is six hundred feet in diameter, the tower 38 is eighty feet high, and the vertical distance between the projectors 34 and 36 is sixty feet. The tower and reflector are opaque for reasons to be explained. Although not shown in the drawing, additional sensors are located on other portions of the surface of the reflector, and illuminated by other associated projectors on the tower, so that the entire surface can be conformed to a set of reference points provided by the projectors. The surface of the antenna is articulated so that one portion of the surface, such as the illustrated portion 32, is controlled by its associated sensor, independently of the other portions. The operation of only one sensor will be described, as they all operate identically.

Figure 3:
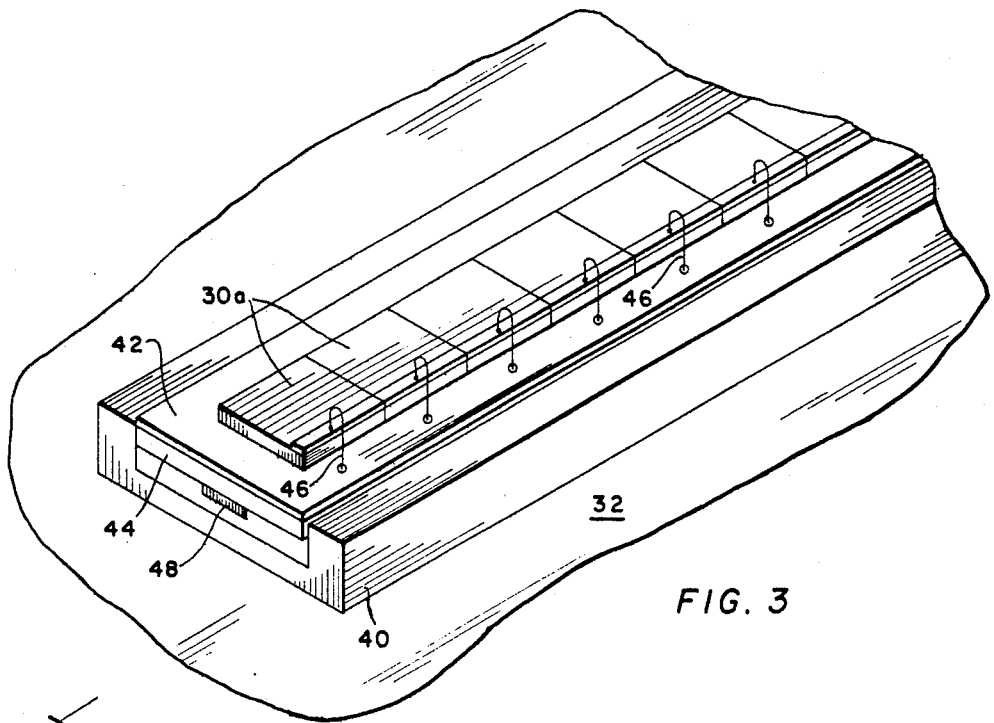
FIG. 3 is a more detailed view of the sensor of FIG. 2.

Since the surface of a reflector of the size indicated is known to move by significant amounts with changes in orientation, the sensor 30 must be of appreciable length, of the order of two feet in the present environment. As shown in FIG. 3, the sensor consists of an array of small photovoltaic cells 30a connected in parallel and mounted on a suitable baseplate 40, which is attached to surface 32. The individual cells are conductively attached to the copper-clad surface 42 of a board 44 formed of insulating material, which, in turn, is attached to the baseplate 40. The collector leads 46 of the individual cells are connected to a copper strip 48 on the underside of board 44 through holes provided for the purpose in surface 42 and in board 44. The length of the sensor is determined by the physical constraints of the system and the output current required. For the present application, the required length of two feet was obtained with an array of thirty 1 x 2 centimeter silicon cells. Silicon cells are particularly advantageous in this application since the light within their passbands is not severely attenuated by fog, haze, or other atmospheric effects that would be encountered. Although not shown in FIG. 3, it may be desirable in some applications to place a filter having a spectral pass band corresponding to the pass band of the light souces over the sensor to minimize generation of output signals due to illumination by extraneous light.

Figure 4:
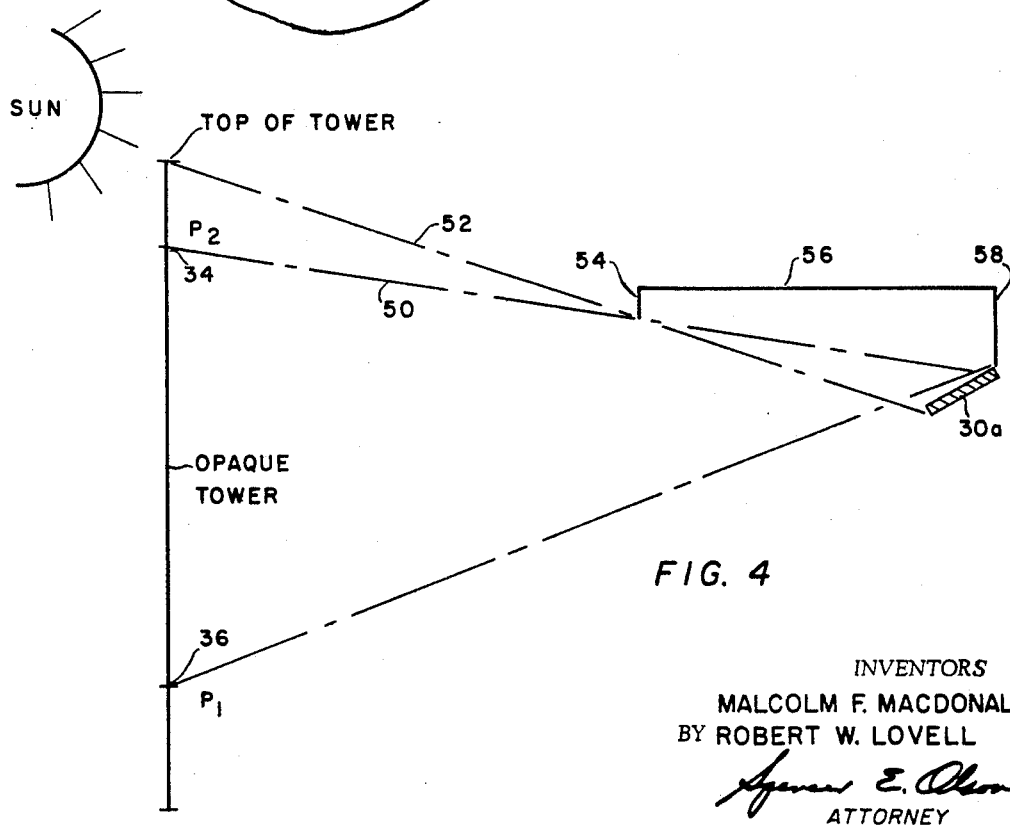
FIG. 4 is a schematic diagram illustrating the principle of a light baffle useful in the practice of the invention.

If the antenna is to be operated in direct sunlight, a light baffle is necessary to prevent saturation of the photocells by the sunlight. Since tower 38 and surface 32 are opaque, it is clear that sunlight normal to the tower and sunlight from beneath surface 32 could not reach the sensor. In FIG. 4, which diagrammatically illustrates the requirements of a baffle, ray 52 is the lowermost ray of light from the sun which can strike cell 30a. Ray 50 is the uppermost ray of light from projector 34 which strikes cell 30a. It is evident that a baffle consisting of a partition 54 extending down to the point of intersection of rays 50 and 52 together with top and back panels 56 and 58, respectively, will prevent all direct sunlight from reaching the cell while allowing projector light to reach the cell. With the illustrated baffle configuration, however, if the entire two foot sensor is to be baffled, panel 56 would have to be thirty feet long. This size being impractical in the system here under discussion, it is preferable to baffle individual cells to keep the size of the baffles within practical limits. If only a tenth of the array of FIG. 3 is baffled by the technique of FIG. 4, panel 56 need be only three feet long.

Figure 5:
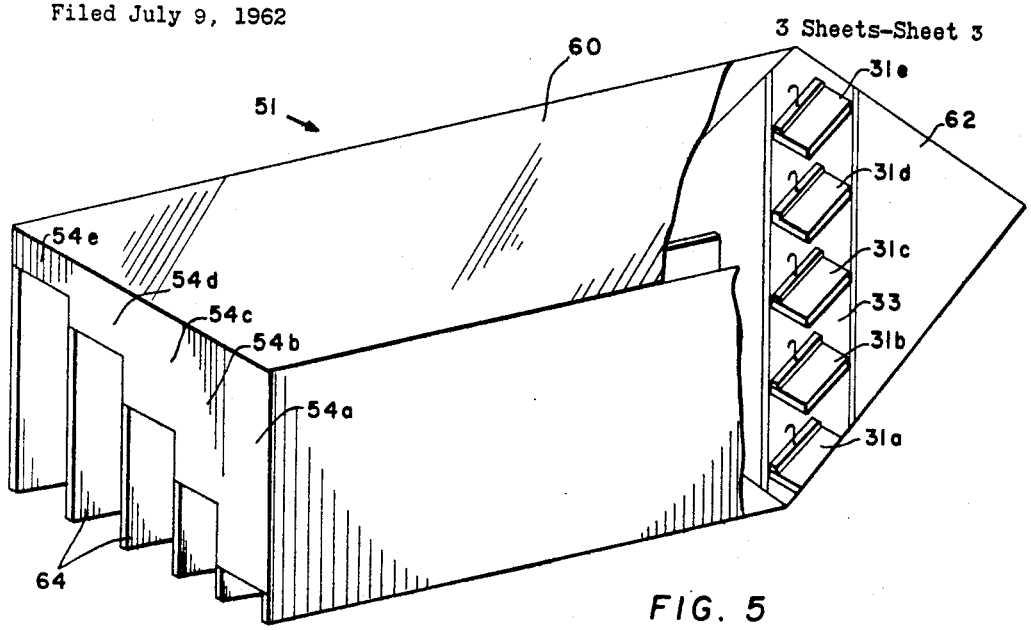
FIG. 5 is a perspective view, partially cut away, of a specific form of light baffle useful with the invention.

By an extension of the concept of FIG. 4, and modification of the sensor, the entire sensor can be baffled with a reasonably sized structure of the form shown in FIG. 5. Here, instead of the individual cells being arranged in a linear array as in FIG. 3 the sensor elements 31a, 31b, etc., are arranged in a staggered array with diagonally opposite corners of each cell aligned with corresponding corners of adjacent cells, as shown. The cells are supported on a suitable baseplate 33, similar in construction to support 40 in FIG. 3, and their collector leads connected in parallel, as by the technique used in the assembly of FIG. 3. The cells are individually baffled by a structure 51 comprising a plurality of baffles of the general configuration shown in FIG. 4 arranged in side by side relationship and aligned with respective ones of the sensor elements 31a, 31b, etc. The baffle for element 31a has a longer front partition 54a than the baffles for the other elements, the length being such that its lower edge reaches the intersection point of rays 50 and 52 (FIG. 4) for element 31a. Similarly, the front partition 54e of the baffle associated with element 31e is of a shorter length, sufficient to reach the intersection point of rays 50 and 52 for this element. The intermediate baffles are of different lengths to satisfy the geometrical requirements for their respective sensors. The structure 51 is completed by a top cover 60, a back cover 62 on which baseplate 33 is mounted, and a plurality of vertical partitions 64. Light from projector 36 can reach the cells through the open bottom of the baffle, while light from projector 34 can reach the cells through the baffled openings which, however, do not admit direct sunlight. For the thirty cell configuration described earlier, the baffle would be approximately three feet long, two feet high, and ten inches wide, a reasonable size when compared to the overall dimensions of the antenna structure. The baffle can be mounted either above or below the antenna surface, although it would be more convenient to mount it below the surface with a suitable slit cut in the surface to allow the projector light to reach the sensor. A further advantage, in addition to its reasonable size, is that the baffle construction can be identical for all the sensors on the antenna surface. Only the height of the baffle openings need be adjusted to suit the geometry of the particular sensor location.

Figure 6:
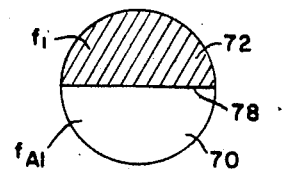
FIG. 6 is a cross-sectional view taken along lines 6—6 of FIG. 2.

In order to allow the sensor to produce a constant output signal regardless of variations in the projector light reaching the sensor, an AGC signal is provided by means of a second beam of light projected by each projector. The projectors 34 and 36 each produce a beam of light chopped at two different frequencies, one frequency being contained in a cone of light, and the other being contained in a half cone coincident with the full cone. In FIG. 2, the full cone of light 70 from projector 34 is chopped at a frequency $f_{A1}$, and the half cone of light 72 is chopped at frequency $f_1$. Likewise, the full cone of light 74 from projector 36 is chopped at frequency $f_{A2}$ while the half cone of light 76 is chopped at frequency $f_2$. A cross-sectional view of the light beams 70 and 72 is shown in FIG. 6, and consists of a full circle of light 70 at frequency $f_{A1}$, and a superimposed half circle of light 72 at frequency $f_1$. Line 78 designates the flat surface of the half cone of light which is used as a reference line in measuring the length of illumination of the sensor. The cross-section of the light beams from projector 36 is identical, except that the frequencies of the full and half cones are different.

Figure 7:
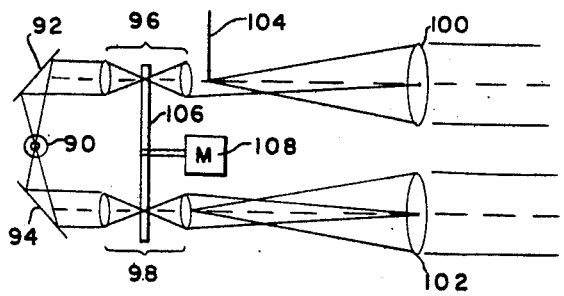
FIG. 7 is a schematic representation of the optical system of one light projector.
Figure 8:
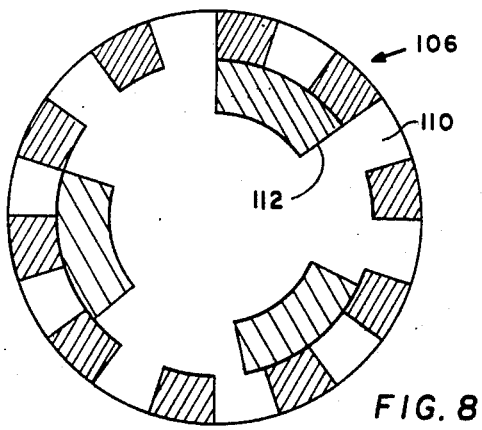
FIG. 8 is a front view of a shutter of the type used in the system of FIG. 7.

The projectors are so aimed that the surfaces 78 and 80 in the two cones of light intersect at a common line on sensor 30 when surface 32 is correctly positioned. The full cones of light are arranged to fully illuminate the sensor at all times in order to provide a reference signal for automatic gain control. The optical system of projectors 34 and 36 are identical and can be any of several known types for producing a dual-frequency light beam. One such system is shown in FIG. 7 and consists of a lamp 90, a pair of mirrors 92 and 94 arranged to be illuminated by the lamp, condensing lenses 96 and 98, and objective lenses 100 and 102. A knife edge 104 is positioned in front of condensing lenses 96 to block half the light passing through the lenses, thereby producing a half cone of light. The light in the two channels is chopped by a shutter 106 driven by motor 108. A front view of a suitable shutter is shown in FIG. 8. The two chopping frequencies are provided by an outer circle 110 of alternate opaque and transparent segments and an inner circle 112 of alternate opaque and transparent segments. The shutter is so positioned between the condensing lenses that light through lenses 96 is chopped by the outer segments 110 while light through lenses 98 is chopped by the inner segments 112. The chopping frequencies are not critical; however, they should not be integral multiples of one another, since they must be harmonically independent to be separated electrically.

It has been found that minute fluctuations of the sun's light intensity cause noise which is located mainly below 600 cycles per second; therefore, in order to increase the signal-to-noise ratio, chopping frequencies above 600 cycles per second preferably are used. Also, since the noise level decreases with increasing frequency, the higher frequencies should be used as signal frequencies, with lower frequencies used for the AGC signal, since they will not be materially affected by the greater noise level. By way of illustration, at a shutter speed of 3,600 r.p.m., the freqencies of light from projector 34, typically, are 1,500 c.p.s. for the signal and 900 c.p.s. for the AGC. For projector 36, typical frequencies are 1,920 c.p.s. for the signal and 1,200 c.p.s. for the AGC.

The positioning operation of the sensor is shown in FIG. 2, in which the surface 32 and the sensor 30 are shown above the correct position. Since the output current of sensor 30 is proportional to the length of illumination, a current is produced which contains a component $i_1$ at a frequency $f_1$ due to the illumination of length $l_1$ by light beam 72, a component $i_2$ at prequency $f_2$ due to illumination of length $l_2$ by light beam 76, and two components $i_{A1}$ and $i_{A2}$ at frequencies $f_{A1}$ and $f_{A2}$ due, respectively, to light beams 70 and 74.

Various well-known electronic means can be used to separate the different frequency components and generate an error signal. For example, the current from sensor 30 may be amplified by a preamplifier 120, which produces an output voltage proportional to the input current and hence proportional to the length of illumination. Thus, the output voltage of preamplifier 120 consists of two signal components $e_1$ and $e_2$, proportional, respectively, to $l_1$ and $l_2$; and AGC components $e_3$ and $e_4$ proportional to L, the total length. The output of the preamplifier is divided into two paths 122 and 124. The signal in path 122 is amplified by amplifier 126 and the frequency $f_1$ recovered by filter 128. The frequency $f_{A1}$ is recovered by filter 130 and fed back to amplifier 126 to provide an automatic gain control to insure that the output from amplifier 126 is proportional only to the length of the sensor illuminated with light at frequency $f_1$ and independent of variations in the current component $i_1$ of the input signal due to changes in ambient light, sensor aging, etc. The signal in path 124 is amplified by amplifier 132, and the frequency $f_2$ recovered by filter 134. Frequency $f_{A2}$ is recovered by filter 136 and fed back to amplifier 132 to provide similar AGC action for the current component $i_2$. The output signals from filters 128 and 134 are respectively amplified by amplifiers 138 and 140 and after rectification applied to differential amplifier 142, which produces an error signal when the signals from amplifiers 138 and 140 are unequal, the sense of the error signal being determined by the magnitudes of the input signals.

Thus, when $E_1>E_2$, the error signal is positive, when $E_2>E_1$, the error signal is negative, and when $E_1=E_2$, no error signal occurs. The error signal drives a servomotor 144, which in turn drives a jack 146, which vertically adjusts surface 32. When the error signal is positive, the jack and, consequently, the surface is driven upward. Conversely, the surface is driven downward when the error signal is negative. When the surface reaches the reference position, equal lengths of sensor are illuminated; therefore, no error signal is generated and the servomotor is stopped. For the illustrated position of the surface 32, $E_2>E_1$, with the consequence that the servomotor is driven downward until surface 32 reaches the point of intersection of surfaces 78 and 80 of the two light beams at which position $E_1=E_2$.

While there has been described what is believed to be a preferred embodiment of the invention, many modifications and changes will ocur to those skilled in the art and still be within the spirit and scope of the present invention. Accordingly, it is not intended to limit the invention to the embodiment or details particularly described, as the invention can be practiced wherever a position or measurement is required in relation to a defined point.

What is claimed is:

1. An electro-optical system for positioning a surface comprising, a light-sensitive element mounted on said surface and capable of producing an output current whose magnitude is a linear function of the area of the element illuminated, first and second light sources each arranged to illuminate a predetermined area of said light sensitive element, first and second means associated with each light source for respectively chopping the light from said first and said second light source at frequencies which are harmonically independent, and means connected to said light-sensitive element and responsive to the output current therefrom to produce an error signal when said surface is displaced from a predetermined position.

2. An electro-optical system for positioning a surface comprising, a pair of spaced apart light sources, means for chopping the light from one of said light sources at a first frequency, means for chopping the light from the other of said light sources at a second frequency harmonically unrelated to said first frequency, a light sensitive element located on the surface to be positioned and operative when illuminated to generate an output current of magnitude proportional to the area of the element illuminated, said element being arranged on said surface to receive light from said pair of light sources, first and second frequency selective means connected to said light-sensitive element and respectively responsive to said first and second frequencies, and means connected to said frequency selective means and operative to produce an error signal when said surface is displaced from a predetermined position.

3. An electro-optical system for positioning a surface comprising, in combination, first and second light sources, first shutter means for respectively chopping light from said first and second light sources at first and second harmonically unrelated frequencies, a photovoltaic sensor located on the surface to be positioned and arranged to receive light from said first and second light sources, said sensor producing components of current proportional respectively to the portion of its length illuminated by said first and second light sources, filter means connected to said sensor for separating said components of current, means connected to said filter means and responsive to the magnitudes of said components for producing an error signal when said surface is displaced from a predetermined position, and motor means operable by said error signal for changing the position of said surface in a direction and by an amount to reduce said error signal to zero.

4. An electro-optical system for positioning a surface comprising, first and second light sources each producing first and second coincident light beams which are respectively chopped at a first and second frequency, the chopping frequencies of the beams from said first light source differing from the chopping frequencies of the beams from said second light source, an elongated photovoltaic sensor mounted on the surface to be positioned and arranged to be illuminated by the light beams from both said sources, baffle means for shielding said sensor, said sensor being operative in response to the chopped light from said sources to produce an electrical signal containing components at the chopping frequencies of said light beams of magnitudes proportional to the portion of its length illuminated by light of each of said frequencies, frequency selective means connected to said sensor for separating said components, means connected to said frequency selective means and operative to produce an error signal when said components differ in magnitude, and motor-driven means operative in response to said error signal to change the position of said surface in a direction and by an amount to reduce said error signal to zero.

5. A system for positioning a movable surface comprising, an elongated photovoltaic sensor mounted on the surface to be positioned, first and second sources of light supported in spaced relationship with said sensor and in fixed spaced-relationship with respect to each other to provide a reference from which departures of said surface from a desired position are measured, each of said first and second light sources being operative to produce first and second light beams respectively chopped at harmonically unrelated first and second frequencies, said light sources being supported to direct their respective beams of light to illuminate equal portions of the area of said sensor when said surface is in the desired position, said sensor being operative to produce an electrical signal containing components at said first and second frequencies of magnitudes proportional to the area of the sensor illuminated by light at each of said frequencies, frequency selective means connected to said sensor for separating said components, means connected to said frequency selective means and operative to produce an error signal when said components differ in magnitude, and motor driven means operative in response to said error signal to change the position of said surface in a direction and by an amount to reduce said error signal to zero.

6. A system for positioning a surface comprising, an elongated photovoltaic sensor mounted on the surface to be positioned, first and second light sources spaced from said sensor and supported to provide a reference from which departures of said surface from a desired position are measured, each of said first and second light sources being operative to produce first and second coincident light beams of circular and semicircular cross-section, respectively, and chopped at first and second frequencies, respectively, the chopping frequencies of the beams from said first light source differing from the chopping frequencies of the beams from said second light source, said light sources being positioned to direct their respective coincident beams to each illuminate the entire length of said sensor with the circular beam and to cause the semi-circular beams to illuminate equal portions of the length of said sensor when said surface is in the desired position, said sensor being operative to produce an electrical signal containing components at the chopping frequencies of said light beams of magnitude proportional to the length of the sensor illuminated by light at each of said frequencies, frequency selective means connected to said sensor for separating said components, means connected to said frequency selective means and operative to produce an error signal when the components due to said semi-circular beams differ in magnitude, and motor-driven means operative in response to said error signal to change the position of said surface in a direction and by an amount to reduce said error signal to zero.

7. The system according to claim 6 including means operative in response to the signal components associated with the circular beam from each of said light sources to eliminate variations in the magnitudes of the signal components associated with corresponding semi-circular beams caused by factors other than the portion of the length of said sensor illuminated by the semi-circular beams.

8. The system according to claim 6 wherein said frequency selective means includes means operative in response to the signal components associated with the circular beams to automatically control the gain of the signal components associated with corresponding semi-circular beams.

References Cited by the Examiner
UNITED STATES PATENTS

| | | | |
|---|---|---|---|
| 2,414,566 | 1/1947 | Thomas | 250—236 X |
| 2,510,374 | 6/1950 | Brady | 88—14 |
| 2,641,712 | 6/1953 | Kircher | 250—211 |
| 2,710,559 | 6/1955 | Heitmuller et al. | 250—204 X |
| 2,802,207 | 8/1957 | Sommer et al. | 88—14 |
| 2,930,545 | 3/1960 | Houle et al. | 250—203 X |
| 2,952,779 | 9/1960 | Talley | 250—203 X |
| 3,012,469 | 12/1961 | Clayborne | 88—14 |
| 3,069,550 | 12/1962 | Neander | 250—202 |
| 3,079,835 | 3/1963 | Saperstein | 250—202 |
| 3,084,261 | 4/1963 | Wilson | 250—203 |
| 3,093,741 | 6/1963 | Meyer | 250—212 |
| 3,111,587 | 11/1963 | Rocard | 250—211 X |

RALPH G. NILSON, *Primary Examiner.*

ARCHIE R. BORCHELT, FREDERICK M. STRADER,
*Examiners.*

E. STRICKLAND, M. ABRAMSON,
*Assistant Examiners.*